US009442405B2

(12) United States Patent
Chun et al.

(10) Patent No.: US 9,442,405 B2
(45) Date of Patent: Sep. 13, 2016

(54) LIQUID ELECTROPHOTOGRAPHIC INKS

(75) Inventors: Doris Chun, Palo Alto, CA (US); Hou T. Ng, Palo Alto, CA (US); Albert Teishev, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/353,672

(22) PCT Filed: Oct. 25, 2011

(86) PCT No.: PCT/US2011/057686
§ 371 (c)(1),
(2), (4) Date: Apr. 23, 2014

(87) PCT Pub. No.: WO2013/062530
PCT Pub. Date: May 2, 2013

(65) Prior Publication Data
US 2014/0287357 A1    Sep. 25, 2014

(51) Int. Cl.
*G03G 9/13*    (2006.01)
*G03G 9/16*    (2006.01)
*C09D 11/10*    (2014.01)
*C09D 11/03*    (2014.01)
*G03G 15/10*    (2006.01)

(52) U.S. Cl.
CPC ................ *G03G 9/16* (2013.01); *C09D 11/03* (2013.01); *C09D 11/10* (2013.01); *G03G 9/13* (2013.01); *G03G 9/131* (2013.01); *G03G 9/132* (2013.01); *G03G 15/10* (2013.01)

(58) Field of Classification Search
CPC .......... G03G 9/16; G03G 9/13; G03G 15/10; G03G 9/132; G03G 9/131; C09D 11/10; C09D 11/03
See application file for complete search history.

(56) References Cited

U.S. PATENT DOCUMENTS

| 6,861,193 | B1 | 3/2005 | Golodetz |
| 7,492,504 | B2 | 2/2009 | Chopra et al. |
| 7,736,829 | B2 | 6/2010 | Silcoff et al. |
| 2006/0194138 | A1 | 8/2006 | Regev et al. |
| 2009/0110843 | A1* | 4/2009 | Halahmi et al. ............ 427/511 |
| 2010/0103437 | A1 | 4/2010 | Li |

FOREIGN PATENT DOCUMENTS

| CN | 102056999 | 5/2011 |
| JP | 4156550 | 5/1992 |
| JP | 07188596 | 7/1995 |
| WO | WO-2007020644 | 2/2007 |
| WO | 2009151446 | 12/2008 |

* cited by examiner

*Primary Examiner* — Peter Vajda
(74) *Attorney, Agent, or Firm* — Thorpe, North & Western L.L.P.

(57) ABSTRACT

The present disclosure provides for compositions, methods, and systems directed towards a liquid electrophotographic ink comprising a carrier fluid, a pigment, a first resin, and a stable cross-linkable resin that is solvated or swellable with the carrier fluid, where the stable cross-linkable resin does not undergo cross-linking until a temperature of at least 110° C. and, once cross-linked, does not melt until a temperature of at least 300° C.

18 Claims, 2 Drawing Sheets

LIQUID ELECTROPHOTOGRAPHIC INKS

BACKGROUND

Digital printing involves technologies in which a printed image is created directly from digital data, for example using electronic layout and/or desktop publishing programs. Some known methods of digital printing include full-color ink-jet, electrophotographic printing, laser photo printing, and thermal transfer printing methods.

Electrophotographic printing techniques involve the formation of a latent image on a photoconductor surface mounted on an imaging plate. In some examples, the photoconductor is first sensitized to light, usually by charging with a corona discharge, and then exposed to light projected through a positive film of the document to be reproduced, resulting in dissipation of the charge in the areas exposed to light. The latent image is subsequently developed into a full image by the attraction of oppositely charged toner particles to the charge remaining on the unexposed areas. The developed image is transferred from the photoconductor to a rubber offset blanket, from which it is transferred to a substrate, such as paper, plastic or other suitable material, by heat or pressure or a combination of both to produce the printed final image.

The latent image is developed using either a dry toner (a colorant mixed with a powder carrier) or a liquid ink (a suspension of a colorant in a liquid carrier). The toner or ink generally adheres to the substrate surface with little penetration into the substrate. The quality of the final image is largely related to the size of the particles, with higher resolution provided by smaller particles.

Dry toners used in solid electrophotography are fine powders with a relatively narrow particle size distribution that are expelled from fine apertures in an application device. Liquid inks used in liquid electrophotography are generally comprised of pigment- or dye-based thermoplastic resin particles suspended in a non-conducting liquid carrier, generally a saturated hydrocarbon.

DETAILED DESCRIPTION

Figure 1:
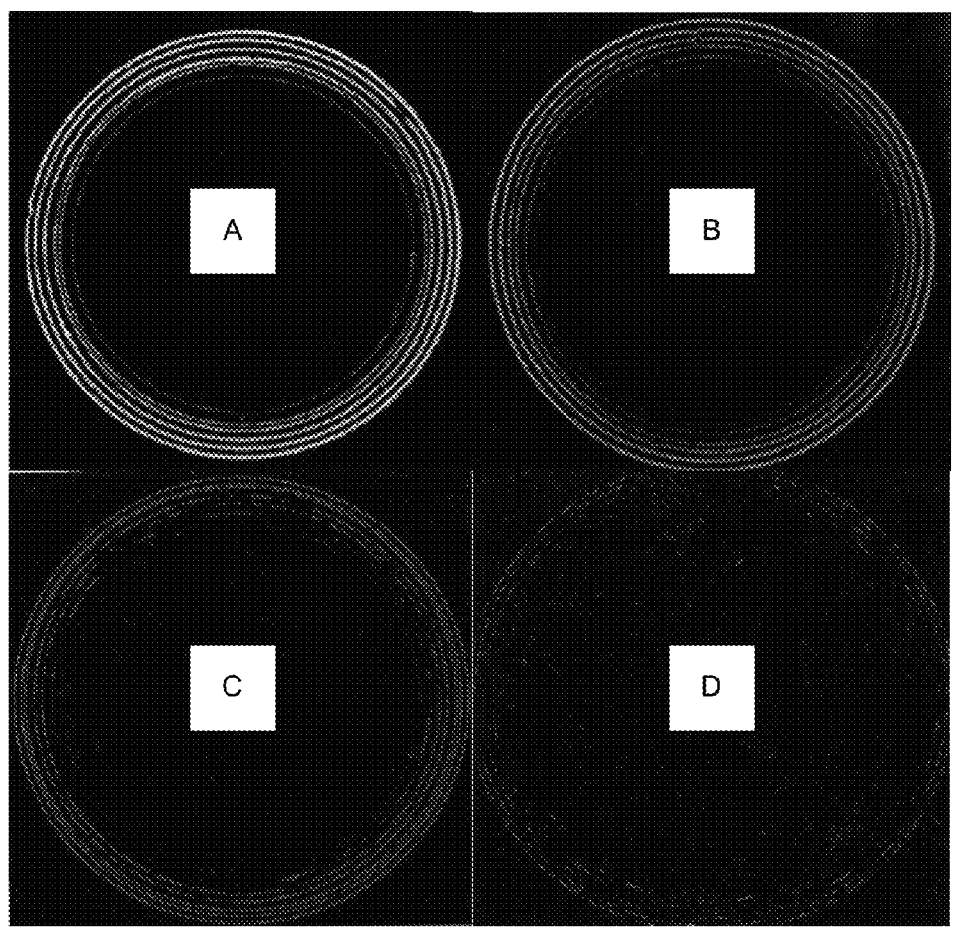
FIG. 1 is a picture of a scratch test of inks of the present disclosure (B, D) and comparative inks (A, D), in accordance with an example of the present disclosure.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "carrier fluid," "carrier liquid," or "liquid vehicle" refers to the fluid in which the pigmented resin material of the present disclosure can be dispersed to form an ink dispersion. Such a carrier liquid can be formulated for electrophotographic printing so that the electrophotographic ink has a viscosity and conductivity for such printing, and may include a mixture of a variety of different agents, including without limitation, surfactants, organic solvents and co-solvents, charge control agents, viscosity modifiers, sequestering agents, stabilizing agents, and anti-kogation agents. Though not part of the electrophotographic liquid vehicle per se, in addition to the pigment and resin, the liquid vehicle can further carry solid additives such as resins, latexes, UV curable materials, plasticizers, salts, charge control agents, etc.

As used herein, "co-solvent" refers to any solvent, including organic solvents, present in the electrophotographic liquid vehicle.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific example, however, the pigment is a pigment colorant.

As used herein, "ethylene acrylic acid copolymer resin" generally refers to both ethylene acrylic acid copolymer resins and ethylene methacrylic acid copolymer resins, unless the context dictates otherwise.

As used herein, "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that a liquid electrophotographic (LEP) ink having a pigment, a resin, a carrier fluid, and a stable cross-linkable resin that is solvated or swellable with the carrier fluid can provide excellent scratch resistance and durability while maintaining acceptable processability. Certain scratch resistance data is provided in the Examples, and shown in FIG. 1. In accordance with this, the present disclosure is drawn to liquid electrophotographic ink compositions, methods, and related systems. It is noted that when discussing the present compositions and associated methods and systems, these discussions can be considered applicable to each of these examples, whether or not they are explicitly discussed in the context of that example. For example, in discussing a carrier fluid for use in a liquid electrophotographic ink, such a carrier fluid can also be used for a method of making the liquid electrophotographic ink or an LEP printing system, and vice versa.

With this in mind, a liquid electrophotographic ink can comprise a carrier fluid, a pigment, a first resin, and a stable cross-linkable resin that is solvated or swellable with the carrier fluid, where the stable cross-linkable resin does not undergo cross-linking below a temperature of 110° C. and, once cross-linked at 110° C. or above, does not melt until a temperature of at least 250° C. In one example, the cross-linked resin does not melt until a temperature of at least 300° C.

It has likewise been discovered, as described herein, that certain resin profiles that can be used in LEP inks provide durable and scratch resistant images when printed. As such, the present LEP inks generally include a resin content comprising a first resin and a stable cross-linkable resin that is solvated or swellable with the carrier fluid of the LEP ink. In light of this, in one example, a liquid electrophotographic ink can comprise a carrier fluid, a pigment, a first resin, and a stable cross-linkable resin that is solvated or swellable with the carrier fluid. Generally, the stable cross-linkable resin does not undergo cross-linking below a temperature of 110° C. and, once cross-linked at 110° C. or above, does not melt until a temperature of at least 250° C., or even 300° C.

Generally, the stable cross-linkable resin can be any resin that is solvated or swellable with the carrier fluid and is capable of cross-linking a first resin in the LEP ink such that the stable cross-linkable resin does not undergo cross-linking below 110° C. and, once cross-linked above that temperature, does not melt until a temperature of at least 250° C., or often at least 300° C. In one example, the stable cross-linkable resin can be selected from the group consisting of epoxy resins, acrylic resins, amino resins, imino resins, combinations thereof, and mixtures thereof, provided they do not cross-link below 110° C., and do not melt once cross-linked until reaching temperatures of at least 250° C., or even 300° C. In one aspect, the stable cross-linking resin can be an amino resin or imino resin. In another aspect, the imino resin can be a highly alkylated melamine imino resin. In one example, "highly alkylated" can be any melamine imino resin having linear or branch alkyl chains having a weight average molecular weight of at least 2000 $M_w$, or in another example of at least 10,000 $M_w$, or yet in another example of at least 100,000 $M_w$.

Generally, the stable cross-linkable resin can be activated by any chemical/physical means. In one example, the stable cross-linkable resin can be cross-linkable upon thermal activation. In another example, the stable cross-linkable resin can be pH dependent. Additionally, the stable cross-linkable resin can generally be present in the ink from about 1 wt % to about 50 wt %. In one example, the stable cross-linkable resin can be present from about 1wt % to about 40 wt % and in one aspect, from about 20 wt % to about 40 wt %.

The LEP inks described herein can also include a charge director. Generally, the charge director can be a negative charge director (NCD) or a synthetic charge director (SCD). In one example, the charge director can be an NCD comprising a mixture of charging components. In another example, the NCD can comprise at least one of the following: zwitterionic material, such as soya lecithin; basic barium petronate (BBP); calcium petronate; isopropyl amine dodecylebezene sulfonic acid; etc. In one specific non-limiting example, the NCD can comprise soya lecithin at 6.6% w/w, BBP at 9.8% w/w, isopropyl amine dodecylebezene sulfonic acid at 3.6% w/w and about 80% w/w isoparaffin (Isopar®-L from Exxon). Additionally, the NCD can comprise any ionic surfactant and/or electron carrier dissolved material. In one example, the charge director can be a synthetic charge director. The charge director can also include aluminum tri-stearate, barium stearate, chromium stearate, magnesium octoate, iron naphthenate, zinc napthenate, and mixtures thereof.

As described generally, the present compositions and methods are directed towards pigmented liquid electrophotographic inks. As such, the pigments can be organic pigments of any color. Thus, the pigments can be organic and/or inorganic pigments. The pigments can be inorganic pigments, or can include metal, metal salts, metal compounds such as metal oxides, and coordinate complexes including their hydrates. Additionally, in one example, the pigments can include aryl groups. In other examples, the pigments can include olefinic groups and/or systems. The pigment can be present in the liquid electrophotographic ink from about 0.01 wt % to about 60 wt % of solids. In still other examples, the pigment can be present from about 0.1 wt % to about 40 wt % of the solids of liquid electrophotographic ink.

Generally, the liquid electrophotographic ink can include a carrier fluid such as an aliphatic hydrocarbon including substituted or unsubstituted, linear or branched, aliphatic compounds. Additionally, such hydrocarbons can include aryl substituents. In one example, the aliphatic hydrocarbons can be substantially nonaqueous, i.e. containing less than 0.5 wt % water. In another example, the aliphatic hydrocarbons can be nonaqueous, i.e. containing no water. The aliphatic hydrocarbons can comprise a member selected from the group of paraffins, isoparaffins, oils, alkanes having from about 6 to about 100 carbon atoms, and mixtures thereof.

Additionally, the aliphatic hydrocarbons, or carrier fluid can comprise, or substantially comprise, or even consist essentially of isoparaffins, such as or equivalent to the ISOPAR® high-purity isoparaffinic solvents with narrow boiling ranges marketed by Exxon Mobil Corporation (Fairfax, Va., USA). Also suitable as an aliphatic solvent or cosolvent, for implementing examples of the present invention are alkanes having from about 6 to about 14 carbon atoms such as solvents sold under the NORPAR® (NORPAR® 12, 13 and 15) tradename available from Exxon Mobil Corporation (Fairfax, Va., USA). Other hydrocarbons for use as an aliphatic solvent, or cosolvent, are sold under the AMSCO® (AMSCO® 460 and OMS) tradename available from American Mineral Spirits Company (New York, N.Y., USA), under the SOLTROL® tradename available from Chevron Phillips Chemical Company LLC (The Woodlands, Tex., USA) and under the SHELLSOL® tradename available from Shell Chemicals Limited (London, UK). Such an aliphatic solvent, or cosolvent, can have desirable properties such as low odor, lack of color, selective solvency, good oxidation stability, low electrical conductivity, low skin irritation, low surface tension, superior spreadability, narrow boiling point range, non-corrosive to metals, low freeze point, high electrical resistivity, low surface tension, low latent heat of vaporization and low photochemical reactivity.

As previously discussed, the liquid electrophotographic inks described herein can include a first resin (that is separate and distinct from the stable cross-linkable resin). Such a resin can be polymerized from monomers selected from the group of ethylene acrylic acid, ethylene methacrylic acid, ethylene acrylic ester maleic anhydride, ethylene acrylic ester glycidyl methacrylate, maleic anhydride, styrene maleic anhydride, and mixtures thereof. In one example, the first resin can be selected from the group of epoxy resins, acrylic resins, amino resins, imino resins, ethylene acrylic acid copolymer resins, combinations thereof, and mixtures thereof. Thus, the first resin can be different than the stable cross-linkable resin. By different, the first resin can have a different solubility in the carrier fluid than the stable cross-linkable resin and/or can be chemically or structurally different than the stable cross-linkable resin.

These resins can also encapsulate the pigment during grinding or mixing to create composite particles of pigment and resin. Generally, the composite particles can have a final particle size from about 1 micron to about 10 microns and produce a printed image at thickness of about 1 micron per separation. The composite particles (e.g., pigment and first resin) can be formulated to provide a specific melting point. In one example, the melting point can be from about 30° C. to about 100° C. In another example, the melting point can be from about 50° C. to about 90° C. Such melting points can allow for desired film formation during printing. Additionally, the present LEP inks can comprise a wax. The wax can be used to help provide for desired melting points. Also, liquid electrophotographic inks can have a conductivity of less than about 300 pS/cm. In one example, the liquid electrophotographic inks can have a conductivity of less than about 200 pS/cm, or in another example, even less than about 100 pS/cm.

The liquid electrophotographic ink compositions of the present disclosure can also be suitable for use on many types of substrates of recording media, including but not limited to vinyl media, cellulose-based paper media, various cloth materials, polymeric materials (non-limitative examples of which include polyester white film or polyester transparent film), photopaper (non-limiting examples of which include polyethylene or polypropylene extruded on one or both sides of paper), metals, and/or mixtures or composites thereof.

Figure 2:
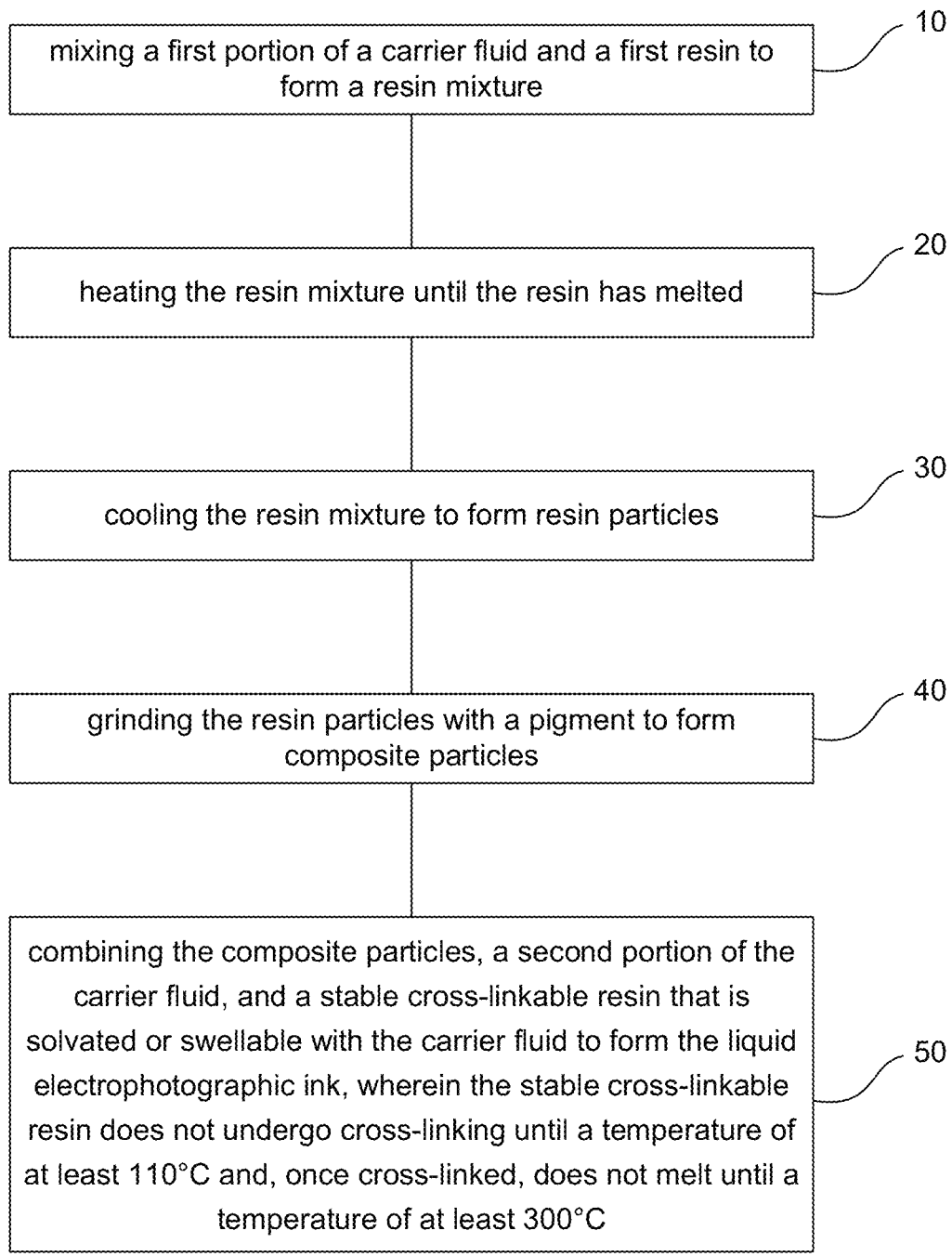
FIG. 2 sets forth a method in accordance with examples of the present disclosure.

Additionally, and as shown in FIG. 2, a method of manufacturing a liquid electrophotographic ink can comprise mixing 10 a first portion of a carrier fluid and a first resin to form a resin mixture; heating 20 the resin mixture until the resin has melted; cooling 30 the resin mixture to form resin particles; grinding 40 the resin particles with a pigment to form composite particles; and combining 50 the composite particles, a second portion of the carrier fluid, and a stable cross-linkable resin that is solvated or swellable with the carrier fluid to form the liquid electrophotographic ink. A stable cross-linkable resin is selected or prepared that not undergo cross-linking below 110° C. and, once cross-linked above that temperature range, does not melt until a temperature of at least 250° C., or even 300° C. In one example, the method can further comprise charging the composite particles. While the present method steps are listed sequentially, it is understood that such steps are not necessarily performed in the recited order. For example, in one example, the step of mixing and the step of heating can be performed simultaneously. Additionally, in one aspect, the grinding step or the combining step can include adding a charge director and a wax.

In addition to the above, a liquid electrophotographic printing system can comprise a liquid electrophotographic printing printer, and a liquid electrophotographic printing ink, as described herein, loaded therein.

Generally, the present methods, compositions, and systems provide an LEP ink that is durable and scratch resistant when printed. In one example, such durability can be measured by a scratch resistance test between the LEP ink and a comparable LEP ink without the stable cross-linkable resin (where the ink is otherwise identical). Scratch resistance testing can be performed by a Taber® Shear&Scratch tester model no. 551 using a contour shear tool (precision ground tungsten carbide has a cutting edge lapped to a 25mm radius with a 30° clearance S-20. The edge is set at a 22° shear angle in relation to the rotation of the table).

EXAMPLES

The following examples illustrate a number of variations of the present compositions and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present compositions and methods have been described above with particularity, the following examples provide further detail in connection with what are presently deemed to be acceptable.

Example 1

Preparation of Liquid Electrophotographic Ink No. 1

An ethylene acrylic acid copolymer resin (1000 grams of Nucrel® by DuPont™ Co.) and isoparaffin (1500 grams of Isopar L® by Exxon Mobile Corp.) were mixed in a double planetary mixer to provide about 40 wt % non-volatile solids. The paste was heated to a temperature of 130° C. during mixing and cooled to room temperature of approximately 22° C. over a period of about 3 hours. This paste was combined with pigment, polyethylene wax, charge adjuvant, and Isopar L®, in the amounts listed in Table 1 in an attritor. The mixture was grinded for 1.5 hours at 50° C. (hot stage) followed by 10.5 hours at 37° C. (cold stage) at 250 rpm. The mixture was then admixed with stable cross-linkable resin (highly alkylated melamine imino resin, Cymel® 1161 from Cytec) in the amount listed in Table 1 to obtain the liquid electrophotographic ink.

TABLE 1

| Component | Weight (g) | Solids (g) | % solids by weight | % ink solids by weight |
|---|---|---|---|---|
| Resin Paste | 500 | 200 | 40 | 10 |
| Stable cross-linkable resin | 165 | 147 | 89 | 7.5 |
| Pigment | 50 | 50 | 100 | 2.5 |
| Polyethylene Wax | 4 | 4 | 100 | 2 |
| Charge Adjuvant | 12 | 12 | 100 | 0.6 |
| Isopar L ® | 1240 | 0 | 0 | 0 |
| Total | 1971 | 413 | 21 | — |

Example 2

Preparation of Comparative Liquid Electrophotographic Ink No. 1

The comparative ink was prepared with the components, the specific amounts, and under the specific conditions of Example 1, except the stable cross-linkable resin was not present.

Example 3

Preparation of Liquid Electrophotographic Ink No. 2

An ethylene acrylic acid copolymer resin (1000 grams of Nucrel® by DuPont™ Co.) and isoparaffin (1500 grams of Isopar L® by Exxon Mobile Corp.) were mixed in a double planetary mixer to provide about 40 wt % non-volatile solids. The paste was heated to a temperature of 130° C. during mixing and cooled to room temperature of approximately 22° C. over a period of about 3 hours. This paste was combined with pigment, polyethylene wax, charge adjuvant, and Isopar L®, in the amounts listed in Table 2 in an attritor. The mixture was grinded for 1.5 hours at 50° C. (hot stage) followed by 10.5 hours at 37° C. (cold stage) at 250 rpm. The mixture was then admixed with stable cross-linkable resin (highly alkylated melamine imino resin, Cymel® 1161 from Cytec) in the amount listed in Table 2 to obtain the liquid electrophotographic ink.

TABLE 2

| Component | Weight (g) | Solids (g) | % solids by weight | % ink solids by weight |
|---|---|---|---|---|
| Resin Paste | 500 | 200 | 40 | 10 |
| Stable cross-linkable resin | 165 | 147 | 89 | 7.5 |
| Pigment | 50 | 50 | 100 | 2.5 |
| Polyethylene Wax | 0 | 0 | 100 | 0 |
| Charge Adjuvant | 12 | 12 | 100 | 0.6 |
| Isopar L ® | 1240 | 0 | 0 | 0 |
| Total | 1967 | 409 | 21 | — |

Example 4

Preparation of Comparative Liquid Electrophotographic Ink No. 2

The comparative ink was prepared with the components, the specific amounts, and under the specific conditions of Example 2, except the stable cross-linkable resin was not present.

Example 5

Durability Data

The liquid electrophotographic ink No. 1 of Example 1, comparative liquid electrophotographic Ink No. 1 of Example 2, the liquid electrophotographic ink No. 2 of Example 3, and the comparative liquid electrophotographic ink No. 2 of Example 4 were printed and measured in the following manner. All four inks were printed on a paper substrate. After printing, the printed ink was allowed to dry and was measured for durability using two scratch resistance tests. The first scratch resistance test included printing at 400% coverage and scratching with Taber® tester. The results are shown in FIG. 1, where the inner circle was scratched using a 10 gram weight with each additional circle being scratched with additional 10 g increments for a total of at least 6 concentric circles. Specifically, FIG. 1(A) corresponds to the Comparative Liquid Electrophotographic Ink No. 1 of Example 2, FIG. 1(B) corresponds to the Liquid Electrophotographic Ink No. 1 of Example 1, FIG. 1(C) corresponds to Comparative Liquid Electrophotographic Ink No. 2 of Example 4, and FIG. 1(D) corresponds to Liquid Electrophotographic Ink No. 2 of Example 3. The results are reported in Table 3 below.

TABLE 3

| | LEP INK No. 1 Example 1 | LEP INK No. 2 Example 3 | Comparative Ink No. 1 Example 2 | Comparative Ink No. 2 Example 4 |
|---|---|---|---|---|
| Scratch Resistance Grading | 3 | 1 | 5 | 2 |

As can be seen in Table 2, the LEP inks as presently disclosed can provide significant improved durability as compared to comparative LEP inks. The durability can be measured as improved scratch resistance on a scale of 1 to 5, where 1 represents minimal to no removal of material across all concentric scratched circles, 2 represents minimal to moderate removal of material across at least half of the concentric scratched circles, 3 represents moderate removal of material across at least half of the concentric scratched circles, 4 represents moderate to extensive removal of material across at least half of the concentric scratched circles, and 5 represents extensive removal of material across at least half of the concentric scratched circles.

Notably, as shown in FIG. 1, the present inks provide significant improvement over comparative inks not having the stable cross-linkable resin, as shown in FIGS. 1(A-B) and 1(C-D).

While the disclosure has been described with reference to certain examples, those skilled in the art will appreciate that various modifications, changes, omissions, and substitutions can be made without departing from the spirit of the disclosure. It is intended, therefore, that the invention be limited only by the scope of the following claims.

What is claimed is:
1. A liquid electrophotographic ink, comprising:
a carrier fluid;
composite particles comprising a pigment and a first resin; and
a stable cross-linkable imino resin that is solvated or swellable with the carrier fluid;

wherein the stable cross-linkable imino resin does not undergo cross-linking below 110° C. and, once cross-linked, does not melt until a temperature of at least 250° C.

2. The liquid electrophotographic ink of claim 1, further comprising epoxy resin, acrylic resin, or amino resin.

3. The liquid electrophotographic ink of claim 1, wherein the imino resin is a highly alkylated melamine imino resin.

4. The liquid electrophotographic ink of claim 1, wherein the stable cross-linkable imino resin is cross-linkable upon thermal activation and is pH dependent.

5. The liquid electrophotographic ink of claim 1, wherein the stable cross-linkable imino resin, once cross-linked, does not melt until a temperature of at least 300° C.

6. The liquid electrophotographic ink of claim 1, wherein the carrier fluid is substantially non-aqueous and includes primarily a aliphatic hydrocarbon selected from the group of paraffins, isoparaffins, oils, alkanes having from about 6 to about 100carbon atoms, and mixtures thereof.

7. The liquid electrophotographic ink of claim 1, wherein scratch resistance of the liquid electrophotographic ink is improved compared to a comparative liquid electrophotographic ink which is devoid of the stable cross-linkable imino resin but is otherwise identical.

8. A method of manufacturing a liquid electrophotographic ink, comprising:
    mixing a first portion of a carrier fluid and a first resin to form a resin mixture;
    heating the resin mixture until the resin has melted;
    cooling the resin mixture to form resin particles;
    grinding the resin particles with a pigment to form composite particles; and
    combining the composite particles, a second portion of the carrier fluid, and a stable cross-linkable imino resin that is solvated or swellable with the carrier fluid to form the liquid electrophotographic ink,
    wherein the stable cross-linkable imino resin does not undergo cross-linking until a temperature of at least 110° C. and, once cross-linked, does not melt until a temperature of at least 300° C.

9. The method of claim 8, further comprising charging the composite particles.

10. The method of claim 8, wherein the steps of mixing and heating are performed simultaneously.

11. The method of claim 8, wherein the grinding step or the combining step include adding a charge director and a wax.

12. A liquid electrophotographic printing system, comprising:
    a liquid electrophotographic printer; and
    a liquid electrophotographic ink loaded in the liquid electrophotographic printer, the liquid electrophotographic ink, including:
        a carrier fluid;
        composite particles comprising a pigment and a first resin; and
        a stable cross-linkable imino resin that is solvated or swellable with the carrier fluid;
    wherein the stable cross-linkable imino resin does not undergo cross-linking below 110° C. and, once cross-linked, does not melt until a temperature of at least 250° C.

13. The system of claim 12, further comprising epoxy resin, acrylic resin, or amino resin.

14. The system of claim 12, wherein the imino resin is a highly alkylated melamine imino resin.

15. The system of claim 12, wherein the stable cross-linkable imino resin is cross-linkable upon thermal activation and is pH dependent.

16. The system of claim 12, wherein the stable cross-linkable imino resin, once cross-linked, does not melt until a temperature of at least 300° C.

17. The system of claim 12, wherein the carrier fluid is substantially non-aqueous and includes primarily a aliphatic hydrocarbon selected from the group of paraffins, isoparaffins, oils, alkanes having from about 6 to about 100 carbon atoms, and mixtures thereof.

18. The system of claim 12, wherein scratch resistance of the liquid electrophotographic ink is improved compared to a comparative liquid electrophotographic ink which is devoid of the stable cross-linkable imino resin but is otherwise identical.

* * * * *

UNITED STATES PATENT AND TRADEMARK OFFICE
CERTIFICATE OF CORRECTION

PATENT NO. : 9,442,405 B2
APPLICATION NO. : 14/353672
DATED : September 13, 2016
INVENTOR(S) : Doris Chun et al.

Page 1 of 1

It is certified that error appears in the above-identified patent and that said Letters Patent is hereby corrected as shown below:

In the Claims

In Column 9, Line 19, in Claim 6, delete "100carbon" and insert -- 100 carbon --, therefor.

Signed and Sealed this
Seventh Day of February, 2017

Michelle K. Lee
*Director of the United States Patent and Trademark Office*